United States Patent [19]
Cheng

[11] Patent Number: 5,306,027
[45] Date of Patent: Apr. 26, 1994

[54] TROLLEY WITH A RETRACTABLE WHEEL ASSEMBLY

[76] Inventor: Chiun-Jer Cheng, No. 20, Lane 327, Sec. 2, Chung Shan Rd., Chung Ho City, Taipei Hsien, Taiwan

[21] Appl. No.: 8,576
[22] Filed: Jan. 22, 1993
[51] Int. Cl.⁵ ............................................. B62B 1/12
[52] U.S. Cl. .................................... 280/30; 280/646; 280/655; 280/47.18; 280/47.29; 297/130
[58] Field of Search ...................... 280/30, 646, 47.25, 280/47.29, DIG. 6, 47.18, 654, 655, 47.17, 47.27, 652; 297/14, 46, 56, 57, 130

[56] References Cited

U.S. PATENT DOCUMENTS

| | | | |
|---|---|---|---|
| 2,918,297 | 12/1959 | Peters | 280/DIG. 6 X |
| 2,957,700 | 10/1960 | Beaurline | 280/DIG. 6 X |
| 3,014,760 | 12/1961 | Gard | 280/DIG. 6 X |
| 3,400,943 | 9/1968 | Meiklejohn | 280/646 |
| 3,947,054 | 3/1976 | Hall | 280/47.29 X |
| 3,997,213 | 12/1976 | Smith et al. | 280/30 X |
| 4,681,341 | 7/1987 | Lai | 280/646 |
| 4,846,486 | 7/1989 | Hobson | 280/47.25 |
| 5,072,958 | 12/1991 | Young | 280/47.29 X |
| 5,161,811 | 11/1992 | Cheng | 280/30 |

*Primary Examiner*—Margaret A. Focarino
*Assistant Examiner*—Michael Mar
*Attorney, Agent, or Firm*—Staas & Halsey

[57] ABSTRACT

A trolley includes a pair of vertical bars defining a pair of legs at lower ends thereof, a supporting plate attached to the lower ends of the vertical bars for carrying articles, such as a golf bag, a sleeve securely mounted to an upper portion of the vertical bars, a lever pivotally mounted to the sleeve, a bracket member mounted on the vertical bars, a pair of arms extending outward from the bracket member and away from the supporting plate and each has a first end pivotally connected to the bracket member and a second end pivotally connected to a connecting member, a linking bar with first end thereof pivotally connected to the lever and a second end thereof pivotally connected to the connecting member, and a wheel removably attached to each connecting member. When pulling down the lever from a lifted position to a lowered position, the wheels move inward and downward onto the ground for supporting the trolley and the article there-on.

4 Claims, 3 Drawing Sheets

5,306,027

TROLLEY WITH A RETRACTABLE WHEEL ASSEMBLY

BACKGROUND OF THE INVENTION

1. Field of the Invention

The present invention relates to a trolley and, more particularly, to a trolley with a retractable wheel assembly for carrying a larger article, such as a golf bag.

2. Description of the Related Art

The Applicant's U.S. Pat. No. 5,161,811 issued on Nov. 10, 1992 discloses a trolley with a foldable seat assembly. Such a trolley, however, is limited to carrying smaller articles as the width between the wheels thereof is relatively small which results in an unstable manner when carrying larger articles. In view of this, the Applicant has developed an improved trolley with a retractable wheel assembly for larger articles.

SUMMARY OF THE INVENTION

A trolley in accordance with the present invention generally includes a pair of vertical bars defining a pair of legs at lower ends thereof, a supporting means attached to the lower ends of the vertical bars for carrying articles, such as a golf bag, a sleeve means securely mounted to an upper portion of the vertical bars, a lever means pivotally mounted to the sleeve means, a bracket means mounted on the vertical bars, a pair of arms extending outward from the bracket means and away from the supporting means and each has a first end pivotally connected to the bracket means and a second end pivotally connected to a connecting member, a linking bar with a first end thereof pivotally connected to the lever means and a second end thereof pivotally connected to the connecting member, and a wheel attached to each connecting member.

The trolley may further comprise a foldable seat assembly attached to the vertical bars in a manner set forth in Applicant's U.S. Pat. No. 5,161,811.

When the lever means is in a lowered position, the trolley is intended not to move. When the lever means is in a lifted position, the trolley is in use to carry articles, such as a golf bag. When pulling up the lever means from the lowered position to a lifted position, the wheels move outward and upward so that the width between the wheels is increased, thereby increasing the stability when carrying weighty articles. Preferably, the wheels are removable such that the wheels may be changed in response to the weight and volume of the article to be carried.

A pivotal hook is provided on the sleeve means to cooperate with a pin on top of the vertical bars to retain the wheels in a lifted position.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
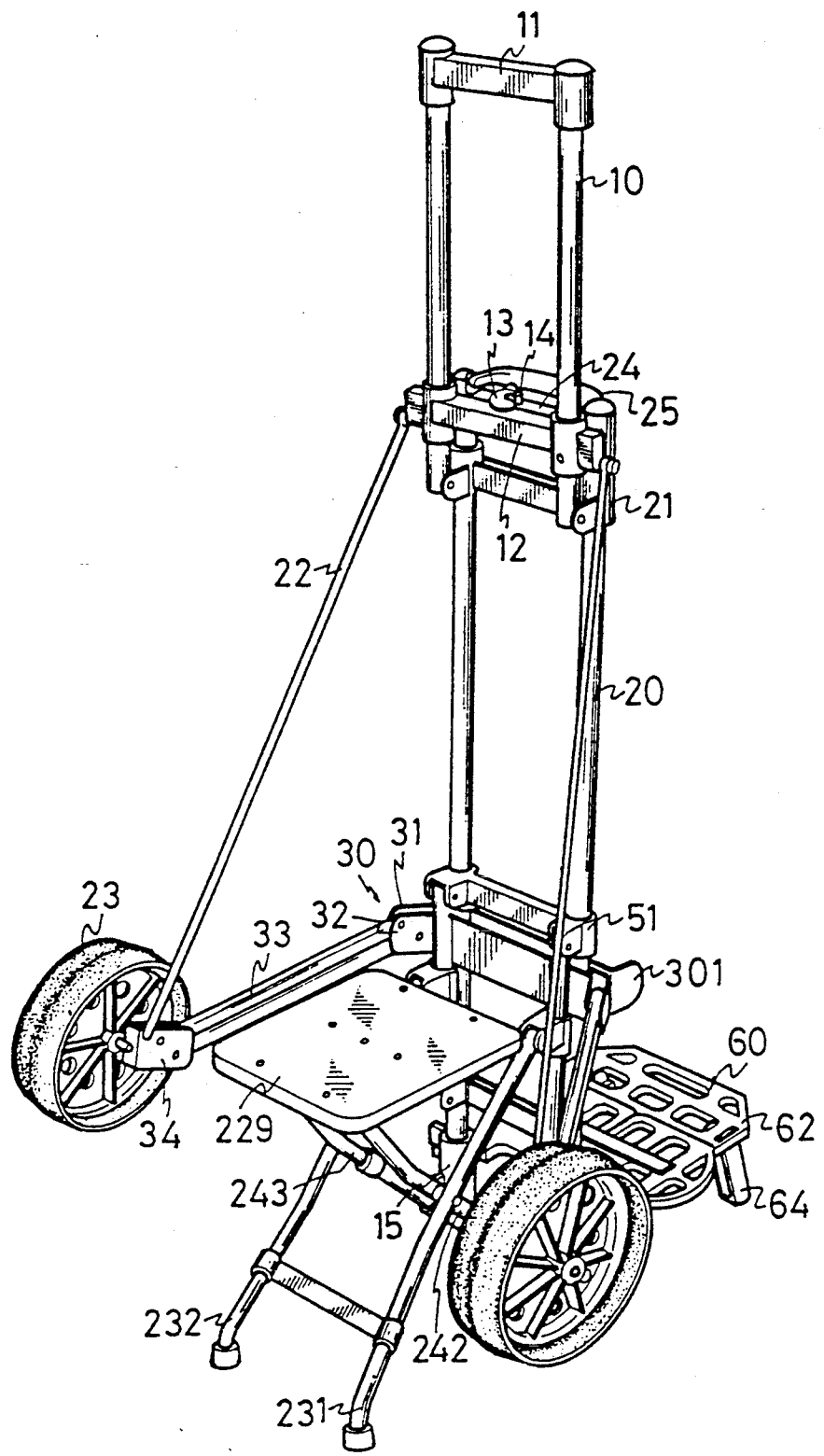
FIG. 1 is a perspective view of a trolley, with a retractable wheel assembly thereof in a lifted status, in accordance with the present invention.
Figure 2:
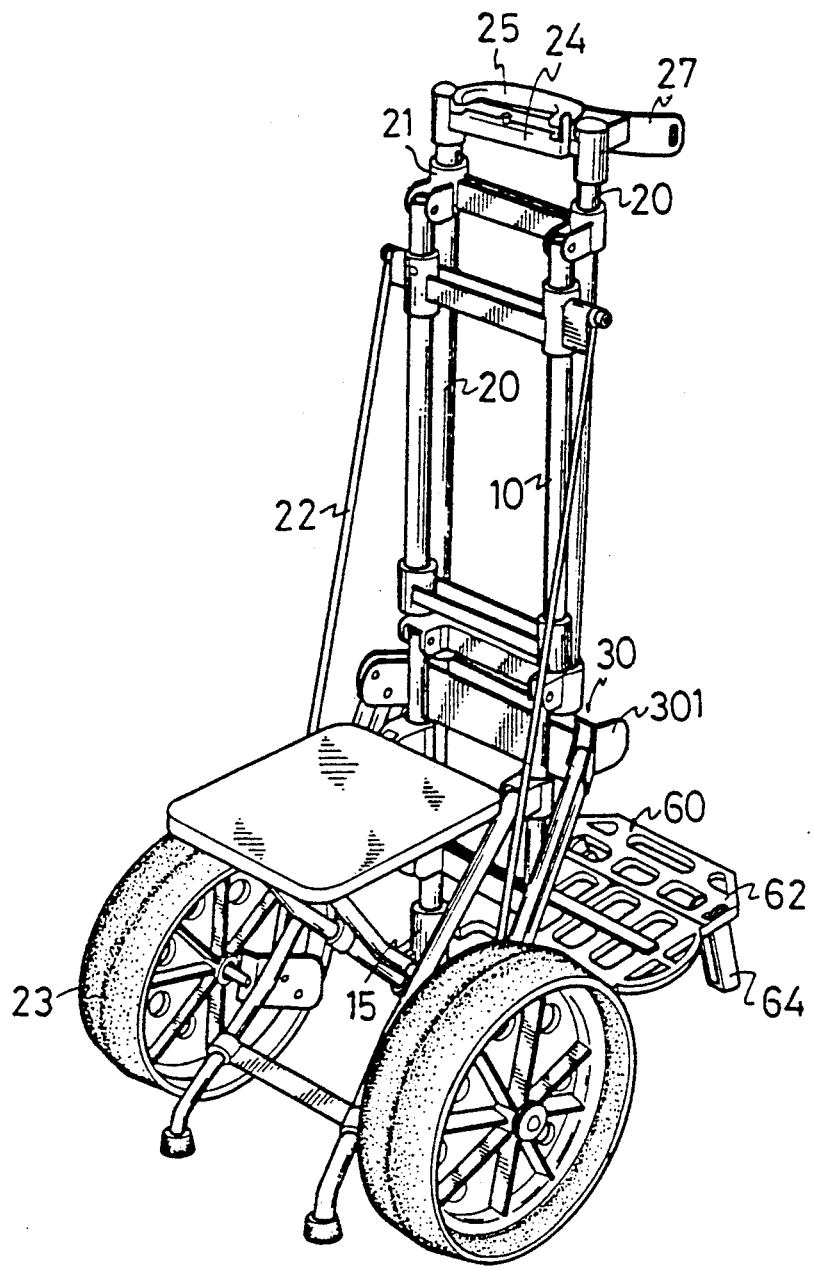
FIG. 2 is a perspective view of a trolley, specifically for carrying a golf bag, with a retractable wheel assembly on the ground, in accordance with the present invention.

Referring to FIGS. 1 and 2, a trolley in accordance with the present invention generally includes a pair of vertical bars 20 defining a pair of legs 15 at lower ends thereof, a supporting means 60 attached to the lower ends of the vertical bars 20 for carrying articles, such as a golf bag, a sleeve means 21 securely mounted to an upper portion of the vertical bars 20, a lever means 10 pivotally mounted to the sleeve means 21, a bracket means 30 mounted on the vertical bars 20, a pair of arms 33 extending outward from the bracket means 30 and away from the supporting means 60 with each arm having a first end pivotally connected to the bracket means 30 and a second end pivotally connected to a connecting member 34, a linking bar 22 with a first end thereof pivotally connected to the lever means 10 and a second end thereof pivotally connected to the connecting member 34, and a wheel attached to each connecting member 34.

The supporting means 60 is substantially a plate 62 with a side pivotally attached to the lower ends of the vertical bars 20 and a leg means 64 foldably mounted to an underside of the plate 62. The bracket means 30 may include a pair of lugs 301 for retaining the supporting means 60 in a folded status.

Additionally, a first handle 24 is provided on top of the vertical bars 20 for grasping by hand. Furthermore, a second handle 25 is provided on top of the vertical bars 20 for lifting the trolley, if desired.

Figure 3:
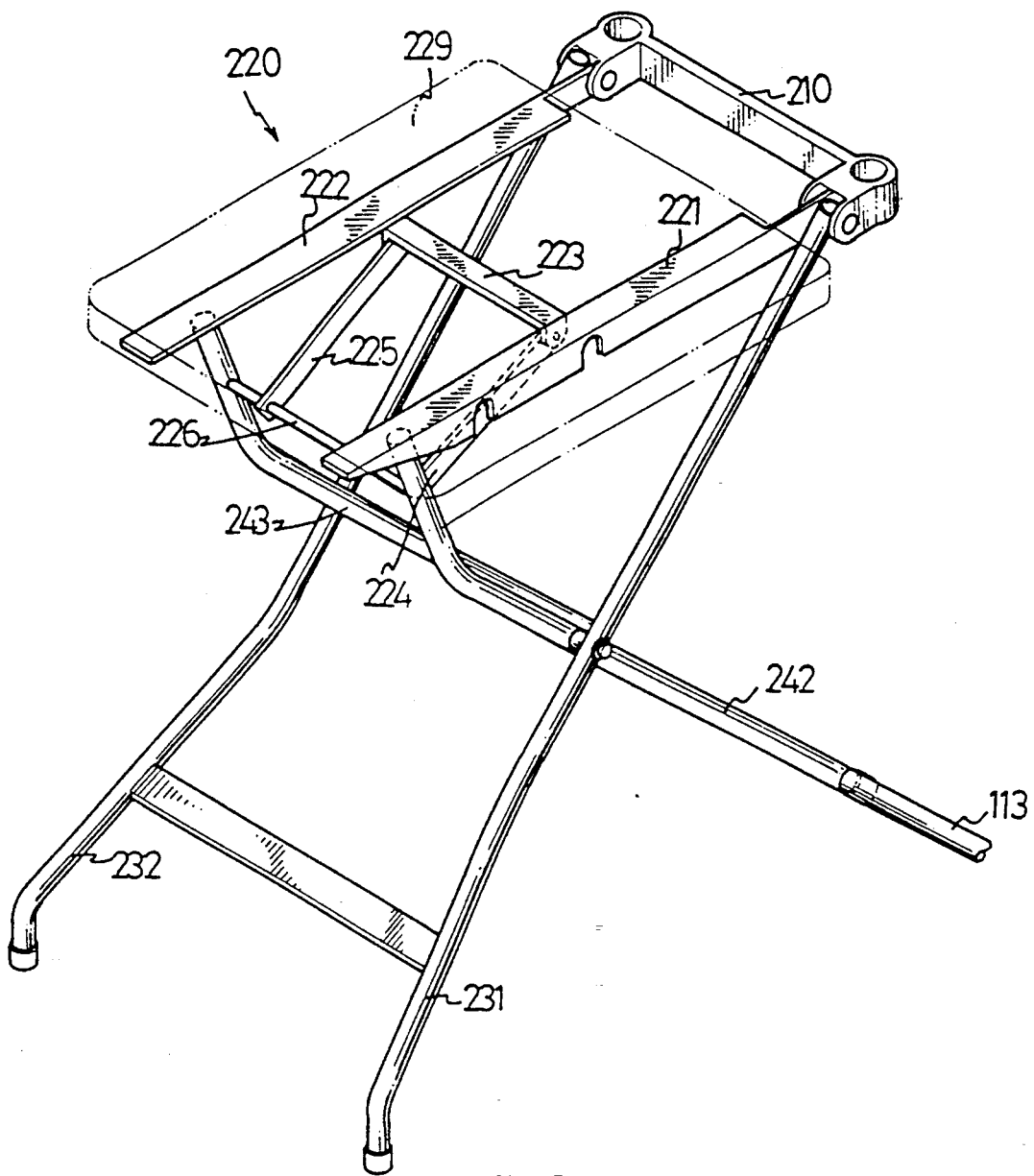
FIG. 3 is a perspective view illustrating the foldable seat assembly attached to the trolley.

Still referring to FIGS. 1 and 2, and further to FIG. 3, the trolley may further comprise a foldable seat assembly which includes the following members:

(1) a second sleeve means 210 slidably mounted on the vertical bars 20;

(2) a seat means 220 pivoted to the second sleeve means 210, comprising a two seat-supporting members 221 and 222 pivoted to the second sleeve means 210, (b) a connecting member 223 attached by respective ends thereof to the middle portions of the two seat-supporting members 221 and 222, (c) two swaying members 224 and 225 having first ends thereof respectively pivoted to the ends of the connecting member 223, and (d) a linking rod 226 to which second ends of the two swaying members 224 and 225 are pivotally attached;

(3) a seat plate 229 fixed on top sides of the first and second seat-supporting members 221 and 222;

(4) a first pair of stands 231 and 232 pivoted to the second sleeve means 210; and (5) a second pair of stands 242 and 243 pivoted to a middle portion of the first pair of stands 231 and 232 at a middle portion thereof and pivoted to a cross bar 113 attached to the lower ends of the vertical bars 20, the linking rod 226 being pivotally attached between the second pair of stands 242 and 243.

Operation of the foldable seat is clearly set forth in Applicant's U.S. Pat. No. 5,161,811, which is incorporated herein by reference.

The wheels 23 of the trolley in FIG. 1 are in a lifted status and the seat assembly is put down to provide a seat. When pulling down the lever means 10 at the handle thereof 11 to a status shown in FIG. 2, the wheels 23 move inward and downward. In FIG. 2, an arcuate plate 27 is provided on the first handle 24 to provide a support for a golf bag if the trolley is used to carry the golf bag.

It is appreciated that when the lever means is in a lowered position, the trolley is intended not to move. To the contrary, when the lever means is in a lifted position, the trolley is in use to carry articles, such as a golf bag. When pulling up the lever means from the lowered position to a lifted position, the wheels move outward and upward so that the width between the wheels is increased, thereby increasing the stability when carrying weighty articles.

Preferably, the wheels 23 are removable such that the wheels 23 may be changed in response to the weight and volume of the article to be carried.

A pivotal hook 13 is provided on the sleeve means 21 to cooperate with a pin 14 on top of the vertical bars 20 to retain the wheels 23 in a lifted position.

Although the invention has been explained in relation to its preferred embodiment, it is to be understood that many other possible modifications and variations can be made without departing from the spirit and scope of the invention as hereinafter claimed.

I claim:

1. A trolley comprising:
   a pair of vertical bars defining a pair of legs at lower ends thereof;
   a supporting means attached to said lower ends of said vertical bars;
   a first sleeve means securely mounted to an upper portion of said vertical bars;
   a lever means pivotally mounted to said first sleeve means;
   a bracket means mounted on said vertical bars (20);
   a pair of arms extending outward from said bracket means, each said arm having a first end pivotally connected to said bracket means and a second end pivotally connected to a connecting member;
   a linking bar with a first end thereof pivotally connected to said lever means and a second end thereof pivotally connected to said connecting member;
   a wheel attached to each said connecting member; and
   a foldable seat means comprising:
   a second sleeve means slidably mounted on said vertical bars;
   a seat means pivoted to said second sleeve means, comprising (a) two seat-supporting members pivoted to said second sleeve mans, (b) a connecting member attached by respective ends thereof to middle portions of said two seat-supporting members, (c) two swaying members having first ends thereof respectively pivoted to said ends of said connecting member; and (d) a linking rod to which second ends of said two swaying members are pivotally attached;
   a seat plate fixed on top sides of said first and second seat-supporting members;
   a first pair of stands pivoted to said second sleeve means; and
   a second pair of stands pivoted at a middle portion thereof to a middle portion of said first pair of stands and pivoted to a cross bar attached to said lower ends of said vertical bars, said linking rod being pivotally attached between said second pair of stands.

2. The trolley as claimed in claim 1 wherein said wheel is removably attached to said connecting member.

3. The trolley as claimed in claim 1 wherein a first handle is provided on top of said vertical bars for hand grasping.

4. The trolley as claimed in claim 1 wherein a second handle is provided on top of said vertical bars for lifting said trolley.

* * * * *